US009165382B2

(12) United States Patent
Song et al.

(10) Patent No.: US 9,165,382 B2
(45) Date of Patent: Oct. 20, 2015

(54) SYSTEM FOR PROVIDING TRAFFIC INFORMATION USING AUGMENTED REALITY

(75) Inventors: Yong-Soo Song, Gyeonggi-do (KR); Yong-Ki Yoon, Gyeonggi-do (KR); Seung-Kwon Shin, Seoul (KR); Seog-Moon Oh, Gyeonggi-do (KR)

(73) Assignee: Korea Railroad Research Institute, Gyeonggi-do (KR)

( * ) Notice: Subject to any disclaimer, the term of this patent is extended or adjusted under 35 U.S.C. 154(b) by 206 days.

(21) Appl. No.: 13/877,058

(22) PCT Filed: Dec. 21, 2010

(86) PCT No.: PCT/KR2010/009170
§ 371 (c)(1),
(2), (4) Date: Mar. 29, 2013

(87) PCT Pub. No.: WO2012/043934
PCT Pub. Date: Apr. 5, 2012

(65) Prior Publication Data
US 2013/0194306 A1 Aug. 1, 2013

(30) Foreign Application Priority Data
Oct. 1, 2010 (KR) .......................... 10-2010-0095946

(51) Int. Cl.
G09G 5/00 (2006.01)
G06K 9/36 (2006.01)
(Continued)

(52) U.S. Cl.
CPC .............. *G06T 11/00* (2013.01); *G06Q 10/047* (2013.01); *G06Q 50/30* (2013.01)

(58) Field of Classification Search
CPC ........ G06T 11/60; G06T 3/4038; G09G 5/14; G06F 17/30265; G06F 3/0481; G06F 9/4443

USPC ................. 345/619, 629–641; 382/284, 305; 715/764, 765, 790, 864
See application file for complete search history.

(56) References Cited

U.S. PATENT DOCUMENTS

| 7,817,104 | B2 | 10/2010 | Ryu et al. | |
|---|---|---|---|---|
| 2007/0164988 | A1 | 7/2007 | Ryu et al. | |
| 2009/0048781 | A1* | 2/2009 | Chan et al. | 702/2 |
| 2009/0271227 | A1* | 10/2009 | Hayat | 705/6 |

(Continued)

FOREIGN PATENT DOCUMENTS

| KR | 10-2007-0019813 A | 2/2007 |
|---|---|---|
| KR | 10-2007-0076304 A | 7/2007 |
| KR | 10-2008-0053617 A | 6/2008 |
| KR | 10-2010-0031375 A | 3/2010 |

OTHER PUBLICATIONS

Feiner, S. "Augmented Reality: Anew Way of Seeing." Scientific American (2002). pp. 48-55.*

Primary Examiner — Ke Xiao
Assistant Examiner — Andrew Shin
(74) Attorney, Agent, or Firm — Rabin & Berdo P.C.

(57) ABSTRACT

The present invention relates to a system for providing traffic information using augmented reality, and comprises: an AR server for providing a virtual image which is obtained by processing transfer information on transfer locations at stops for transportation means and information according to the transportation means, using characters and graphics; and a personal portable communication device which displays the virtual image received from the AR server while overlapping the virtual image on a real-captured image of a transfer location obtained through a camera. According to the present invention, a virtual image which displays transfer information on transfer locations such as bus platforms, subway stations, airports and the like and information according to transportation means and the like is displayed while being overlapped on an actual real-captured mage, thereby making it possible for a user to easily and simply obtain information on the detailed traffic flow at transfer locations or the surroundings thereof.

4 Claims, 2 Drawing Sheets

(51) Int. Cl.
*G06K 9/54* (2006.01)
*G06F 3/14* (2006.01)
*G06T 11/00* (2006.01)
*G06Q 10/04* (2012.01)
*G06Q 50/30* (2012.01)

(56) References Cited

U.S. PATENT DOCUMENTS

2010/0322516 A1* 12/2010 Xu et al. ............... 382/173
2010/0325563 A1* 12/2010 Goldthwaite et al. ........ 715/757

* cited by examiner

SYSTEM FOR PROVIDING TRAFFIC INFORMATION USING AUGMENTED REALITY

TECHNICAL FIELD

The present invention relates to a system for providing traffic information using augmented reality, and in particular to a system for providing traffic information using augmented reality which makes it possible for a user to know traffic information around a transfer location in more real and convenient ways using an augmented reality combined with a real environment and a virtual environment on the basis of a personal portable communication device such as a cellular phone or the like.

BACKGROUND ART

In order to go to a specific designation, basic information on the features on surroundings and geography are needed. When a person is strange in a certain region or in case of complicated regions, it is hard to search for a destination.

In order to improve the above mentioned problems, a portable communication device such as a cellular phone, PDA, etc. is equipped with a navigation function for a user to easily find his current place or to easily search for a designation; however such navigation function provides a map information with a position information on the current position of a cellular phone communication device using a 2D or 3D graphic map or the like, so the map information sometimes provides wrong information, which make a user confused when searching for a designation.

In recent years, a photographed image of reality has information such as a road view and a Google map which shows a destination using position information on the basis of a GPS technology; however it is configured to provide a user with a previously stored image information, not a real time image, in a single direction on the basis of GIS, so the user receives only very limited information. In this case, various surrounding information that a user wants cannot be checked or provide to the user.

Various typical systems providing the current traffic information provides only kinds based on costs and times, not detailed traffic flows or surrounding traffic information.

DISCLOSURE OF INVENTION

Accordingly, the present invention is made to improve the above mentioned problems encountered in the conventional art and other problems. It is an object of the present invention to provide a system for providing traffic information using augmented reality which has features in that the virtual images graphically processed with information on transportation means running around a transfer region and information on a surrounding of a transfer region are overlapped on a real image obtained through a camera of a personal portable communication device and are shown for a user to see, the above features of which can be implemented using an augmented reality technology which is configured to overlap a virtual ovjet on a real world image that a user actually sees through a personal portable communication device with a camera.

To achieve the above objects, there is provided a system for providing traffic information using augmented reality, comprising an AR server which provides virtual images obtained by processing, in the form of characters or graphics, a transfer information of a transfer location in which a transportation means stops and a transportation means information; and a personal portable communication device which displays images by overlapping a virtual image received from the AR server on an actual image of a transfer location received through a camera.

At this time, the AR server is configured to receive, from a transfer information and transportation means information server, a transfer information on the transportation means stopping at a transfer location formed of a bus stop, a subway stop, an airport or the like and a transportation means information, respectively.

In addition, the transfer information of the transportation means comprises a complexity data formed of a line and a waiting time of the transportation means, and the transportation means information comprises a vehicle convenience data on a vacant seat, an indoor temperature change, an air flow and a micro dust concentration by the transportation means, and a carbon emission data on a carbon emission mileage by the transportation means.

In addition, the AR server is configured to collect virtual images processed in the form of characters or graphics by collecting transfer location surrounding information from a measuring device formed of a traffic signal installed at a transfer location of a bus stop, a subway, an airport or the like, a CCTV in station, a traffic CCTV and a temperature and carbon dioxide measurement device and to store the collected virtual images and to manage them.

In addition, the AR server is configured to store and manage the ovjet containing a transfer information of the transfer location and a transportation means virtual image.

In addition, the AR server comprises a public ovjet DB storing and maintaining public ovjets, and a personal ovjet DB storing and managing personal ovjets which are uploaded through a persona portable communication device.

In addition, the personal portable communication device comprises a camera obtaining images; a GPS receiving unit receiving the information on the current position; a communication unit receiving virtual images from the AR server; an arithmetic and control unit controlling for a virtual image received from the AR server to overlap on an actual image of a transfer location obtained through the camera; a display unit displaying the images in which the virtual image is overlapped on the actual image; a key input unit provided for a user to input keys; and a power unit for supplying electric power.

At this time, the transfer location is one among a bus stop, a subway station and an airport.

ADVANTAGEOUS EFFECTS

According to the present invention, the virtual images showing transfer information and transportation means information at a transfer location such as bus stops, subway stations, airports, etc. are overlapped on an actual real image, so the user can obtain detailed traffic flows or surrounding information at a transfer location in easier and convenient ways.

BEST MODES FOR CARRYING OUT THE INVENTION

The features of the system for providing traffic information using an augmented reality according to the present invention will be well understood with reference to the accompanying drawings.

Figure 1:
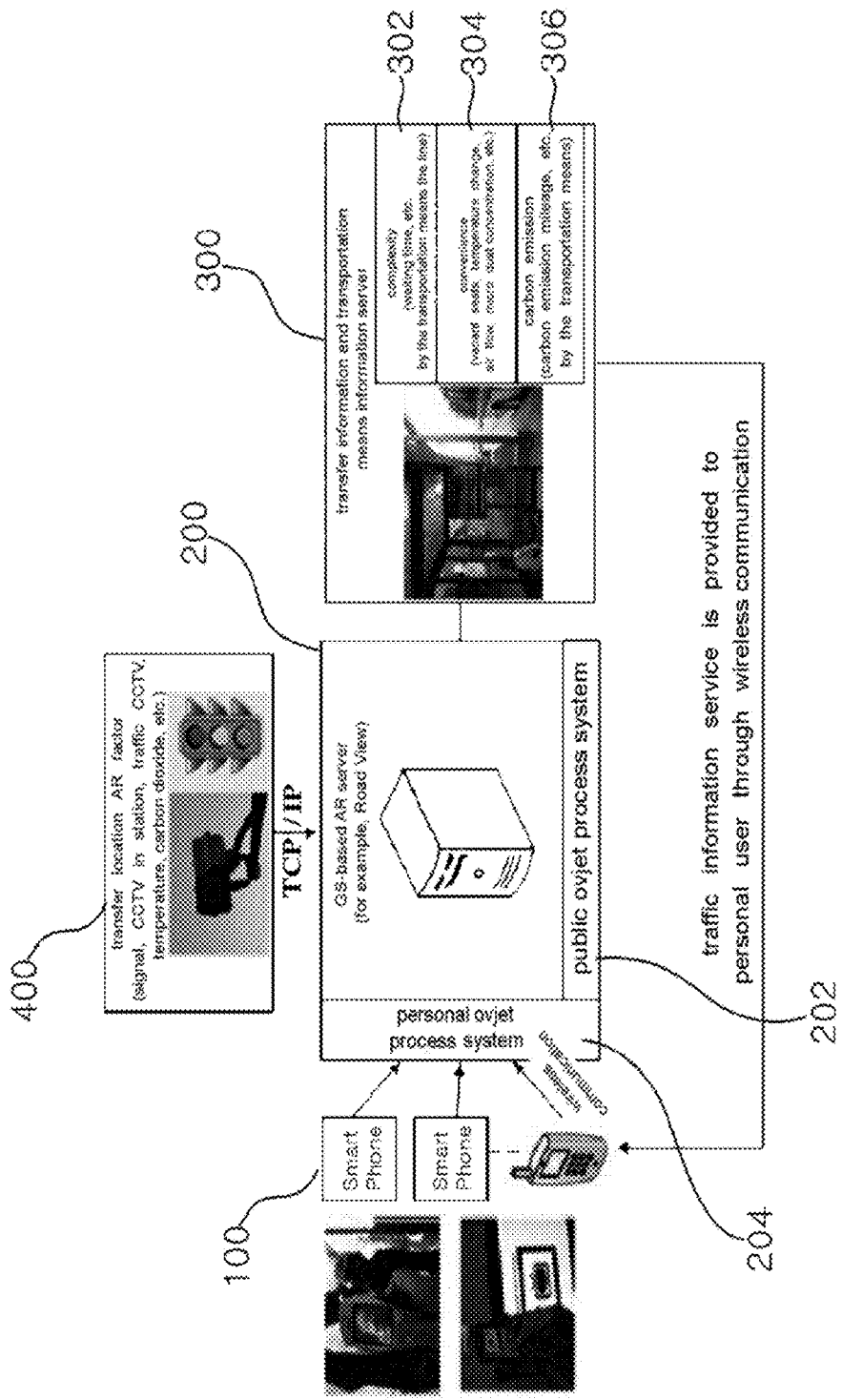
FIG. 1 is a view illustrating a construction of a system for providing traffic information using an augmented reality according to the present invention.
Figure 2:
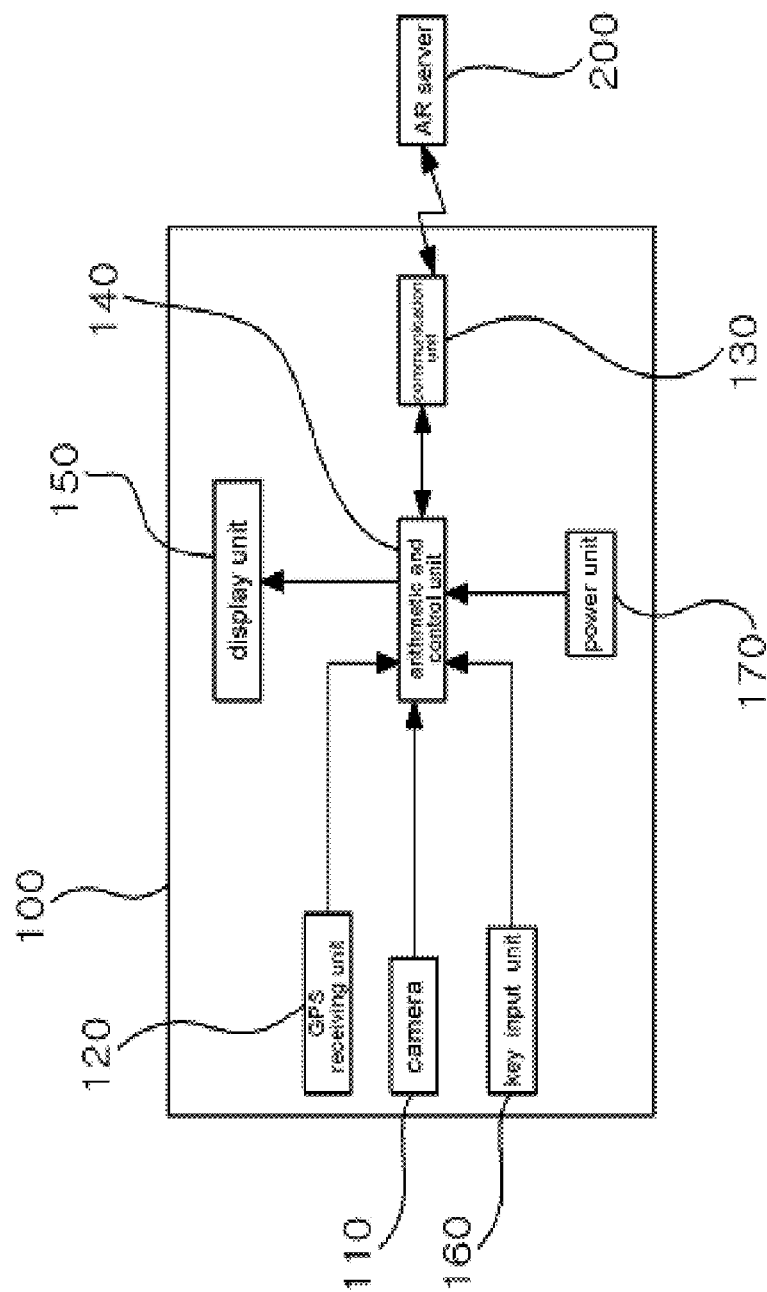
FIG. 2 is a view illustrating a detailed construction of a personal portable communication device according to the present invention.

As shown in FIGS. 1 and 2, the system for providing traffic information using an augmented reality according to the present invention is directed to using an augmented reality technology.

Here, the augmented technology is directed to a technology helping overlap a virtual ovjet on a real world that a user actually sees. Since a virtual world with added information is overlapped on a real world in real time, it is called a mixed reality (MR).

The above mentioned augmented reality is advancing to a hybrid R system configured to mix a real environment with a virtual environment, which technology is widely developed in the US and Japan since the end of the 1990's.

The augmented reality basically configured to supplement the real world with a virtual world is directed to using a virtual environment made of computer-aided graphics; however it is actually implemented on the basis of actual environment. Here, the computer-aided graphic is used so as to add more information to the actual environment, by which it is hard to recognize any difference between the actual environment and the virtual screen since a 3D virtual image is overlapped on an actual image that a user currently sees. The virtual reality technology helps a user be absorbed in a virtual environment, in which environment a user cannot see an actual environment; however the augmented reality technology in which an actual environment is mixed with a virtual ovjet allows a user to see an actual environment, so a user can enjoy both reality-like environment and added information.

The present invention has features in that it is possible to utilize transfer information such as a transfer location such as a bus stop, a subway station, an airport, etc. and service lines, service intervals and waiting time of a transportation means carrying passenger, convenience information of a transportation means and expanded information complexity and boarding delay time at a bus stop, a subway station, an airport, etc. and an air flow and freshness of a transfer location and a transportation mean, which can be achieved by recognizing various ovjets which are virtual images obtained by processing the information of transfer locations in the form of characters or graphic forms. Here, the transfer location is designed for people to use a transportation means such as a bus, a subway, etc.

At this time, the ovjet is directed to an augmented reality service provided in combination with various information in real time on an actual screen that a user can see through the camera 10 of the personal portable communication device 100, so the user can obtain useful information from the currently displaying images. A new ovjet can be made and stored and managed.

The present invention comprises an AR server 200 which provides ovjets obtained by processing transfer information of a transfer location such as bus stops, subway stations, airports, etc., transportation means information and traffic information of a transfer location in the form of characters or computer-aided graphics, and a personal portable communication device 100 which receives, from the AR server 200, the ovjets on the traffic information of the current transfer location when an actual image of the transfer location is obtained through the camera 100 and displays the ovjets.

The construction of each element of the present invention will be described.

The AR server 200 provides ovjets on transfer information at a transfer location such as bus stops, subway stations, airports, etc. and transfer means information in relation with a plurality of personal portable communication devices 100 and stores in database and manages them.

At this time, the AR server 200 receives the information on the transportation means stopping at a transfer location such as a bus stop, a subway station, an airport, etc. from transfer information and transportation means information server 300.

Here, the transfer information and transportation means information server 300 provides transfer information and transportation means information of the transportation means running along a certain line to the AR server 200, and the AR server 200 converts them to a virtual image processed in the forms of characters or graphics, and the processed virtual images are stored in the database and are managed.

The transfer information of the transportation means contains a complexity data 302 such as a line and waiting time of a transportation means. The transportation means information comprises a vehicle convenience data 304 such as vacant seats, indoor temperature changes, air flows and micro dust concentration of transportation means, and a carbon emission data 306 such as a transportation means-based carbon emission mileage.

In this case, the complexity data 302, the vehicle convenience data 304 and the carbon emission 306 are collected from a plurality of transportation means running along lines to the transfer information and transportation means information server 300 and are managed. It is preferred that the transportation means comprises a communication module for the sake of communications and various sensors such as a temperature sensor and a gas sensor for monitoring an indoor temperature contamination of a transportation means.

The AR server 200 performs an information transmission and receipt in relation with the transfer information and transportation means information server 300 through a network.

When the personal portable communication device 100 requests the complexity data 302, the vehicle convenience data 304 and the carbon emission data 306 of the transfer information and transportation means information server 300, such data may be directly transferred to the personal portable communication device 100, not through the AR server 200.

In addition, the AR server 200 is configured to collect the transfer location surrounding information measured by a measurement device 400 such as a traffic light, a CCTV in station, a traffic CCTV, a temperature and carbon dioxide measuring device installed at a transfer location such as a bus stop, a subway station, an airport, etc. and to store the information in a database in the form of virtual images of characters or graphics.

The AR server 200 can generate and manage the ovjets using the information of the transfer information and transportation means information server 300 and the transfer location surrounding information measured by the measuring device 400 installed at the transfer location.

At this time, the ovjet managed by the AR server 200 is formed of a public ovjet DB 202 storing and managing public ovjets, and a personal ovjet DB 204 storing and managing the personal ovjets uploaded through the persona portable communication DB 204, which personal ovjet DB 204 stores the information in the database and manages the same.

The personal portable communication device 100 can be connected to the AR server 200 and can download or upload ovjets containing virtual images. The personal portable communication device 100 comprises a camera 110 obtaining images, a GPS receiving unit 120 receiving the information on the current position, a communication unit 130 transmitting and receiving the ovjets, which are 3D virtual images, from the AR server 200, an arithmetic and control unit 140 controlling for the actual image of the transfer location obtained through the camera 110 to overlap on the virtual image received from the AR server 200, and a display unit 150 displaying the traffic information having the overlapped actual image and virtual image.

The personal portable communication device 100 comprises a key input unit 150 for a user to input keys, and a power unit 170 for the sake of power supply.

The procedures of the traffic information provision using an augmented reality according to the present invention will be described.

In case that a user wants to check a traffic information of a transfer location on the personal portable communication device 100, the user connects to the AR server 200 by handling the key input unit 160 and downloads a transfer information from the transfer location and an ovjet which is a graphic data on the transportation means information or the like.

In this case, the user receives the current position information through the GPS receiving unit 120. When the user executes the ovjet of the current transfer location and activates the camera 110, on the actual image of the transfer location obtained through the camera 110 depending on the position information is overlapped the transfer information of the transportation means running a certain line which is shown in the form of a virtual graphic image and the transportation means information 300, so the user can easily check the traffic information so as to use a bus, a subway or the like which is the transportation means.

The user can receive in real time and continuously, through the personal portable communication device 100, the transportation means complexity data 302 such as the line and waiting time of the transportation means, the vehicle convenience data 304 such as vacant seats of a corresponding transportation means, the change in indoor temperatures, the air flow and the concentration of micro dusts and the carbon emission data 306 such as carbon emission mileage, etc. by the transportation means. The virtual images on the running information near the transfer locations can be generated and transmitted to the AR server 200 and can be stored and managed in the AR server 200.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

INDUSTRIAL APPLICABILITY

The present invention is directed to a system for providing traffic information using augmented reality, and in particular to a system for providing traffic information using augmented reality which makes it possible for a user to know traffic information around a transfer location in more real and comfortable ways using an augmented reality combined with a real environment and a virtual environment on the basis of a personal portable communication device such as a cellular phone or the like.

What is claimed is:

1. A system for providing traffic information using augmented reality, comprising:
   an augmented reality (AR) server collecting transfer location surrounding information from measuring devices installed around a transfer location and producing virtual images, the AR server including
      a public ovjet DB storing and maintaining public ovjets, and
      a personal ovjet DB storing and managing personal ovjets;
   a personal portable communication device carried by a user and separated from the AR server, the personal portable communication device communicating with the AR server in a wireless manner and including
      a camera obtaining actual images,
      a GPS receiving unit receiving information on a current position,
      a communication unit receiving the virtual images from the AR server,
      an arithmetic and control unit overlapping the virtual images received from the AR server on the actual images obtained through the camera,
      a display unit displaying the overlapped images thereon,
      a key input unit provided for the user to input keys, and
      a power unit for supplying electric power; and
   transportation means running on a line and carrying a passenger, the transportation means including
      a communication module for communicating,
      a first sensor for sensing a temperature of an inside of the transportation means,
      a second sensor for monitoring an air flow and a concentration of micro dusts inside the transportation means,
      a third sensor for monitoring carbon emission data of the transportation means, and
      a fourth sensor for checking vacant seats in the transportation means; an information server collecting and managing
   transfer information including the line and a waiting time of the transportation means to be stopping at the transfer location, and
   transportation means information including the vacant seats, the inside temperature, the air flow, the concentration of micro dust and the carbon emission data of each of the transportation means from the transportation means,
   wherein the AR server receives the transfer information and the transportation means information from the information server and collects the transfer location surrounding information from the measuring devices, produces the virtual images corresponding to the actual images based on the transfer information, the transportation means information and the transfer location surrounding information in a form of characters or graphics, stores the virtual images therein, and provides the virtual images to the personal portable communication device, and
   wherein the personal portable communication device overlaps the virtual image received from the AR server on the actual image obtained through the camera and displays the overlapped images thereon.

2. The system of claim 1, wherein the measuring devices include at least one of a traffic signal, a CCTV in station, a traffic CCTV and a temperature and carbon dioxide measurement device.

3. The system of claim 1, wherein the transfer location is one among a bus stop, a subway station and an airport.

4. The system of claim 1, wherein when the personal portable communication device requests the transfer information and the transportation means information to the information server, the information server directly, not through the AR server, transfers the transfer information and the transportation means information to the personal portable communication device.

\* \* \* \* \*